US011635917B2

(12) United States Patent
DeRosa

(10) Patent No.: US 11,635,917 B2
(45) Date of Patent: Apr. 25, 2023

(54) APPARATUS AND METHOD FOR SORTING DISK COMMANDS ON ENERGY USED BY THE DISK COMMANDS

(71) Applicant: Seagate Technology LLC, Fremont, CA (US)

(72) Inventor: Jeffrey V. DeRosa, Burlington, MA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 113 days.

(21) Appl. No.: 17/369,050

(22) Filed: Jul. 7, 2021

(65) Prior Publication Data

US 2023/0009029 A1 Jan. 12, 2023

(51) Int. Cl.
*G06F 3/06* (2006.01)

(52) U.S. Cl.
CPC .......... *G06F 3/0659* (2013.01); *G06F 3/0625* (2013.01); *G06F 3/0653* (2013.01); *G06F 3/0679* (2013.01)

(58) Field of Classification Search
CPC .... G06F 3/0659; G06F 3/0625; G06F 3/0653; G06F 3/0679
See application file for complete search history.

(56) References Cited

U.S. PATENT DOCUMENTS

| | | | |
|---|---|---|---|
| 8,072,704 B1 | 12/2011 | Goldberg et al. | |
| 8,719,520 B1* | 5/2014 | Piszczek | G06F 3/0689 |
| | | | 709/219 |
| 9,965,206 B2 | 5/2018 | Bass, Jr. et al. | |
| 10,192,576 B1* | 1/2019 | Gaertner | G06F 3/0676 |
| 10,692,519 B1* | 6/2020 | McGrath | G06F 1/3221 |
| 11,093,135 B1* | 8/2021 | Ali | G06F 3/0673 |
| 2015/0261473 A1 | 9/2015 | Matsuyama et al. | |
| 2017/0031409 A1* | 2/2017 | Lester | G06F 3/0653 |

* cited by examiner

Primary Examiner — Nicholas J Simonetti
(74) Attorney, Agent, or Firm — Mueting Raasch Group

(57) ABSTRACT

For each seek command of a plurality of seek commands of a hard disk drive, a correction value is determined that adjusts an access time of the seek command. The correction value includes a scaling factor that adjusts an energy variable. The scaling factor is based on a power target of the hard disk drive, and the energy variable may represent an energy used in the seek command as a time value. The seek commands are sorted in a command queue by the adjusted access times. The seek commands are executed by a controller of the hard disk drive based on the sorting within the command queue.

20 Claims, 9 Drawing Sheets

```
1   AlphaCorr = CmdDataPtr->SeekEnergy * Alpha;
2   // AlphaCorr is the adaptive energy correction factor.
3   if( AlphaCorr > ONE_REV_SEEK_OVERHEAD)
4   {
5     CmdDataPtr->AvgAccessTime
6         += (servo_wedge) ONE_REV_SEEK_OVERHEAD;
7     BilinearFitSeekEnergy( ); // Calculate new energy with
8                                // the extra rev added on.
9     AlphaCorr = CmdDataPtr->SeekEnergy * Alpha;
10            // recalulate the correction with an extra rev
11            // added on and see
12            // if a second rev should be added.
13
14    if( (AlphaCorr > ONE_REV_SEEK_OVERHEAD))
15    {
16      CmdDataPtr->AvgAccessTime
17        += (servo_wedge) ONE_REV_SEEK_OVERHEAD;
18      AlphaCorr = 0;// Don't add any additional energy
19                    // once 2 extra revs added on
20    }
21  }
22  CmdDataPtr->AvgAccessTime += AlphaCorr;
```

© Copyright 2021, Seagate Technology LLC

*FIG. 3*

APPARATUS AND METHOD FOR SORTING DISK COMMANDS ON ENERGY USED BY THE DISK COMMANDS

SUMMARY

The present disclosure is directed to an apparatus and method for sorting disk commands based on energy used in the disk commands. In one embodiment, a method involves, for each seek command of a plurality of seek commands of a hard disk drive, determining a correction value that comprises a scaling factor that adjusts an energy variable. The scaling factor is based on a power target of the hard disk drive and the energy variable represents an energy used in the seek command as a time value. The method further involves determining that the correction value exceeds a single revolution overhead, and in response, recalculating the correction value by recalculating the energy variable with the single revolution overhead added to an access time of the seek command. The recalculated correction value is added to an access time associated with the seek command to obtain an adjusted access time. The seek commands are sorted in a command queue by the adjusted access times. The seek commands are executed by a controller of the hard disk drive based on the sorting within the command queue.

In another embodiment, a method involves, for each seek command of a plurality of seek commands of a hard disk drive, determining a correction value that comprises a scaling factor that adjusts an energy variable. The scaling factor is based on a power target of the hard disk drive and the energy variable represents an energy used in the seek command as a time value. The method further involves sorting the seek commands in a command queue by the adjusted access times. The seek commands are executed by a controller of the hard disk drive based on the sorting within the command queue. An estimated energy use of the hard disk drive is determined while executing the seek commands for a unit of time using a control model that includes the scaling factor. An actual energy use of the hard disk drive is determined for the unit of time when executing the seek commands. Based on a difference between the estimated energy use and the actual energy use, the scaling factor is adaptively updated so that the model more closely predicts the actual energy use.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIG. 3 is a code listing showing an example of energy-based command sorting according to an example embodiment;

Figure 1:
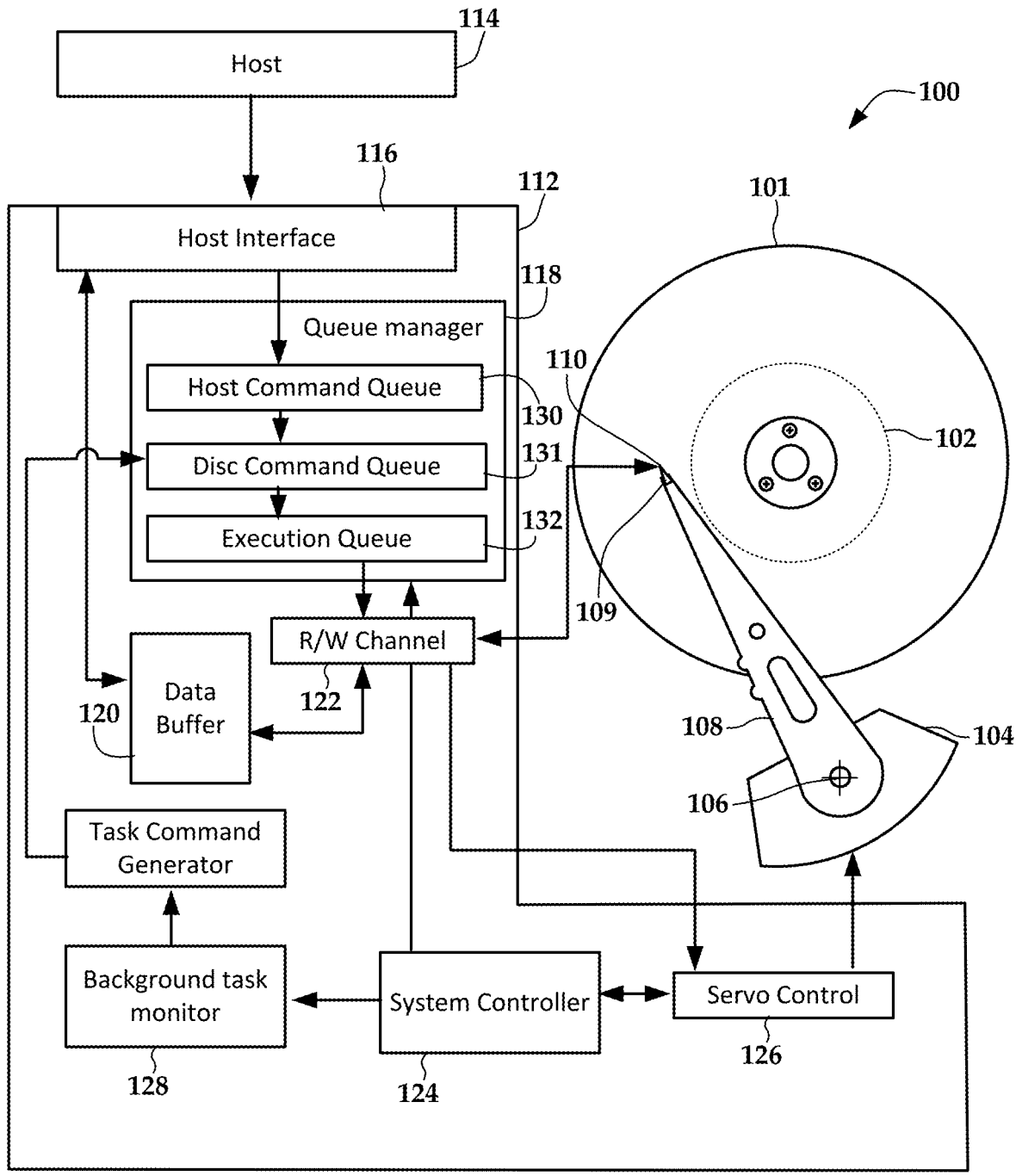
FIG. 1 is a block diagram of an apparatus according to an example embodiment.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

DETAILED DESCRIPTION

The present disclosure generally relates to hard disk drives. A hard disk drive (HDD) stores data on a magnetic disk that is read from and written to by a magnetic head that is placed over the disk while it is rotating. The HDD is typically coupled to a host (e.g., disk drive controller on a motherboard, disk array controller in a storage server) via a storage interface, e.g., SATA, SAS, USB, Ethernet. The host commands the HDD to perform storage operations such as read, write, and verify. The speed with which the HDD can respond to host requests depend on a number of factors, such as rotation speed of the disk, seek speed of the actuators that move the read/write heads over the disk, seek distance and rotational latency needed to execute a particular command, and parallelism features (e.g., two or more independent actuators).

While storage technologies such as solid-state drives (SSD) are increasingly popular for some uses, such as boot drives for personal computing devices, HDDs are still valuable to users who need large storage capacities, e.g., >2 TB. Hard disk drives are often preferred in these situations due to their relatively low cost per unit of storage. This low storage cost is with good data access speed, at least compared to other bulk storage options such as optical drives or tape. For example, data centers currently use utilize large numbers of HDDs to satisfy the demands for large amounts of Internet data storage. Data centers and similar users are expected to add new storage capacity at an increasing rate in the foreseeable future. In order to cost-effectively satisfy expected storage demands of these users, the storage capacity of individual HDDs will continue to increase.

An enterprise storage facility such as a data center will typically pack a large number of HDDs into individual enclosures. For this type of application, it is generally more desirable to increase the amount of data stored in each enclosure rather than adding new enclosures. For example, an enclosure that can house 50 drives can more cost-effectively store 1000 TB of data by using a single enclosure filled with 20 TB drives rather than using two enclosures filled with 10 TB drives. Even if the 20 TB drives are slightly more than twice the cost of the 10 TB drive, this can be offset by the reduced use of rack real estate and power consumption that would result if two enclosures were needed.

Some high-capacity drives will generally include features that increase data throughput. This can make the drives more responsive during use and has other practical benefits for data centers. For example, the time involved in repairing a failed drive in a RAID array increases with drive capacity, and an HDD with increased input-output operations per second (IOPS) can reduce the time an array operates in a degraded mode while a replacement volume is rebuilt due to drive failure.

Measures taken to increase IOPS in an HDD, such as faster read and write channels, faster voice coil motor (VCM) actuators, multiple or split VCMs, etc., can also increase the power consumption of the drive. Power budgets are also something data centers are sensitive to, as this can increase cooling costs as well as the amount of electricity consumed by the devices themselves. As such, it is useful for an HDD to include features that allow reducing power consumption without significantly impacting performance.

The present disclosure is directed to an HDD that can sort commands based on energy used by the commands to minimize power consumption. To better understand the concepts described below, the block diagram in FIG. 1 shows details of an HDD apparatus 100 which may utilize power-aware command sorting as described herein. The HDD 100 includes a spindle motor 102 that rotates one or more disks 101. Information is written to and read from tracks on the disks 101 via an actuator assembly 104, which rotates during a seek operation about an axis 106 positioned adjacent the disks 101. The actuator assembly 104 includes one or more actuator arms 108 that extend towards the disks 101, with one or more head-gimbal assemblies 109 extending from each of the actuator arms 108. Mounted at the distal end of each head-gimbal assembly 109 is a head 110 that includes read and write transducers, e.g., magnetoresistive sensors, write coils, etc.

During a seek operation, the track position of the heads 110 is controlled through the actuator assembly 104, which typically uses a voice coil motor (VCM) to rotate the arms 108. The controlled application of current to the VCM causes the heads 110 to move across the surfaces of the disks 101. The heads 110 are positioned over one or more tracks containing data and servo information for controlling the position of the heads 110. Note that the HDD 100 may include multiple actuator assemblies that rotate around different axes and/or a split actuator assembly that includes two VCMs that rotate around a single axis and independently control different arms and heads on different disk surfaces.

The HDD 100 includes one or more circuit boards 112 for controlling its operations. For example, the circuit boards 112 include a host interface 116 that receives commands and/or data from a host 114 (e.g., a computer and/or drive controller board). The host commands are buffered and processed via a queue manager 118 to optimize command completion time (CCT). Data that is to be written to or read from the HDD 100 may be stored in a volatile or non-volatile data buffer 120. A read/write channel 122 encodes and serializes the data and provides the requisite write current signals to the heads 110. To retrieve data that has been previously stored by the HDD 100, read signals are generated by the heads 110 and provided to the read/write channel 122, which performs decoding and error detection and correction operations and outputs the retrieved data to the host interface 116 for subsequent transfer to the host 114.

A system controller 124 may include one or more processors (e.g., microprocessor, co-processors, digital signal processors, etc.) that run software/firmware that provides top-level communication and control for the HDD 100. The system controller 124 also provides control signals for spindle motor 102 and actuator 104 via servo controller 126. The system controller 124 also operates a background task manager 128 that manages the prioritization and execution of background commands dictated by software/firmware of the system controller 124.

In operation, the host 114 sends commands to the HDD 100 with instructions to read data from or write data to the disks 101. A write command typically includes data to be written to the disks 101 along with a logical address indicating where the data is to be written. A read command typically includes a logical address indicating the location or locations of data to be read, and a size indicator indicating the number of bytes to be read. The commands are received by the host interface 116, where they may be processed immediately or stored for later processing via the queue manager. The queue manager 118 may store the commands and their associated data and/or addresses so that the commands can be sorted, ordered, or prioritized in such a way that IOPS performance may be improved.

The illustrated queue manager 118 is shown utilizing three queues 130-132, although in practice more or fewer queues may be used. A host command queue 130 is used to store commands after receipt via the host interface 116. The commands are implemented as data structures referred to as 'command nodes' that include command data (e.g., track, sector, data size, addresses within the data buffer 120 where data to be written is cached) as well as pointers to other nodes, e.g., pointers to next and/or previous nodes in linked list implementations.

Some of command nodes from the host queue 130 are placed into the disk command queue 131. Some command nodes from the host queue 130 may not be placed in the disk command queue 131 if the commands don't need to be immediately serviced via the disk hardware, such as write commands that are cached in a fast memory (e.g., volatile memory, flash memory, etc.) The nodes of the disk command queue 131 are sorted based on an optimization algorithm that considers disk latency as well as other factors (e.g., aging of the command). For example, a rotational position sort (RPS) algorithm will place command nodes into the sorted queue 131 according to, among other things, a time it takes for the affected heads to reach positions on the disks 101 (e.g., track, sector) which are accessed by the command. The RPS algorithm may take into account a number of latencies, including, but not limited to, the rotational latency, the seek time, and the disk access time. When a command is ready to be executed, it is moved into the execution queue 132, where it is executed immediately if no commands are currently being executed, or after the completion of a currently executing command.

Figure 2:
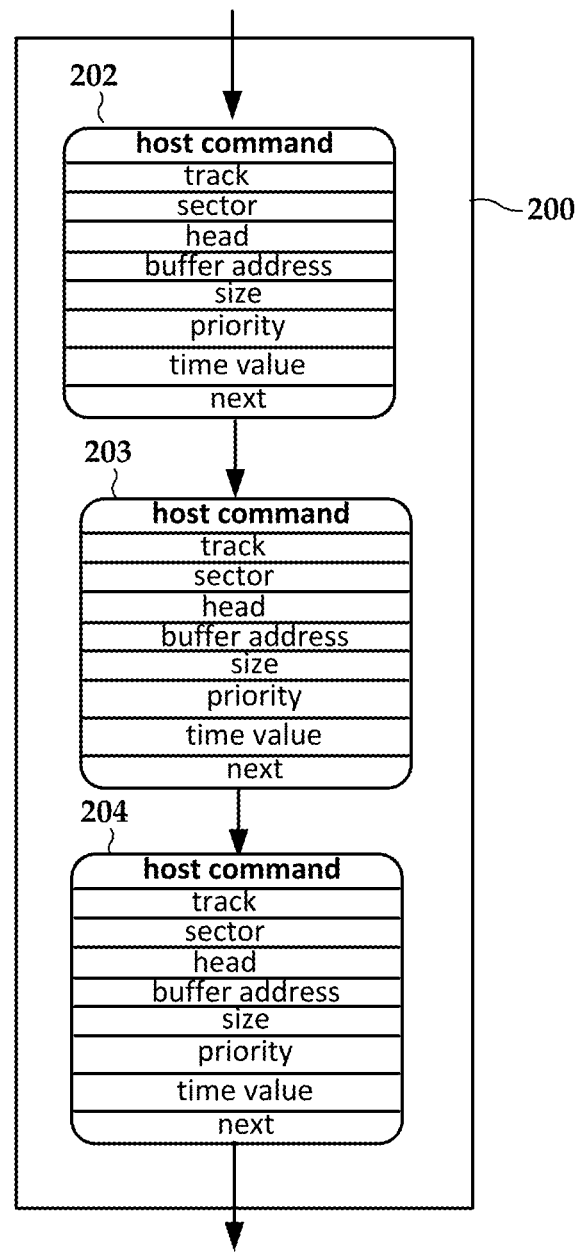
FIG. 2 is a block diagram of a command queue according to an example embodiment.

In FIG. 2, a block diagram shows a command queue 200 used by HDD firmware according to an example embodiment. The queue 200 may be sorted or unsorted, and is shown with three nodes 202-204, each representing a different input-output (TO) operation. The nodes 202-204 are arranged as a singly linked list in this example, although other data structures may be used, e.g., doubly linked list, binary tree, etc. The nodes 202-203 include data fields that represent the command to be executed (e.g., track, sector, head, buffer address), fields that are used by the sorting algorithm (e.g., priority, time value), and fields used to arrange the queue (e.g., next pointer). Note that this is a simplified representation of the command nodes, and in practice the command nodes may have more detailed information and/or different information.

As nodes are added and removed from the queue, the nodes in the queue may be re-sorted based on updated time values. In existing drives, the sorting is configured to optimize CCT. In embodiments described herein, the drive firmware can adjust the time values to also account for energy consumed by an operation, thereby reducing energy used to service the commands. For example, the firmware can use an in-drive power/energy model to calculate a time base penalty. For a given IO, the time base penalty is used by the sorting loop to find the next IO to be performed. The correction can be calculated as AlphaCorr=Alpha*EnergyContributionForThisSeek, where 'Alpha' is a scaling factor that converts the energy in Joules to a time in wedges. The correction is added to the access time, for this IO, and then the IO is evaluated against the other IO's in the queue that have had their access times calculated in the same way.

Values for 'Alpha' can range from 0 (no correction) to 0.3 with little change in IOP's performance (~3% reduction) but large reduction in power levels (~30%). Very large values of 'Alpha' can be used to dramatically reduce power with relatively modest reduction in IOP's (Alpha=1, IOP's drop of 10%, power drop of ~60%). 'Alpha' can also be adaptively changed in-drive to optimize power levels for changing environments. By closing a control loop around the power error (Estimated Power−Target Power) 'Alpha' can be adapted in real time and meet performance requirements.

In FIG. 3, a code listing 300 illustrates an access time power correction according to an example embodiment. The AlphaCorr correction factor is initially calculated at line 1 of the listing 300, where Alpha is a scaling factor that adjusts an energy variable CmdDataPtr->SeekEnergy, shortened to SeekEnergy hereafter. The scaling factor Alpha is based on a power target of the hard disk drive and the energy variable SeekEnergy is an estimate of energy consumed for the seek needed to carry out the operation. The energy variable SeekEnergy represents the energy as a time (e.g., a time in wedges on the disk). For example, SeekEnergy is derived such that a greater energy used in the seek will result in an increase in access time for the command, reducing the commands sorting position in the queue.

At line 3 of the listing 300, the code determines that the correction factor AlphaCorr exceeds a single revolution overhead. This determination allows the algorithm to work for even un-queued workloads (Q1) and for power targets well below the nominal values. If AlphaCorr exceeds a single revolution overhead, the algorithm adds the single revolution overhead to the command node access time at lines 5-6 and recalculates the energy value via the function on line 7. This function, BilinearFitSeekEnergy computes the new energy value based on, among other things, the value of AvgAccessTime which was increased at lines 5-6. The recalculated energy value is used to recalculate the correction value at line 9.

If the recalculated correction value is still greater than a one seek overhead as determined at line 14, then another single revolution overhead is added to the command node access time at lines 16 and 17. Since access times longer than two revolutions may not be considered by the queuing algorithm, there is no point in further increasing the access time, so the line 18 effectively caps the access time increase to two revolutions. At line 22, the correction value Alpha-Corr is added to the access time associated with the seek command to obtain an adjusted access time. The seek command data modified in this code segment is used to sort the seek commands in a command queue by the adjusted access times. The seek commands are executed by a controller of a hard disk drive based on the sorting within the command queue.

There are a number of possible ways to set the scaling factor Alpha. A constant value could be used (e.g., a value fixed in firmware), or series of values could be stored (e.g., in a table), where each stored value corresponds to a different condition of use. In embodiments described below, the value of Alpha is dynamically updated based on conditions of use. An energy target value is defined, and the value of Alpha is increased if energy use approaches or exceeds the energy target, and the value of Alpha is decreased if energy use falls significantly below the target. For example, Alpha can be made directly proportional to an error between a control model of the system and a measurement of an output of the system, in which case the value of Alpha will increase or decrease together with the error to dynamically reduce the error and satisfy the energy target.

Figure 4:
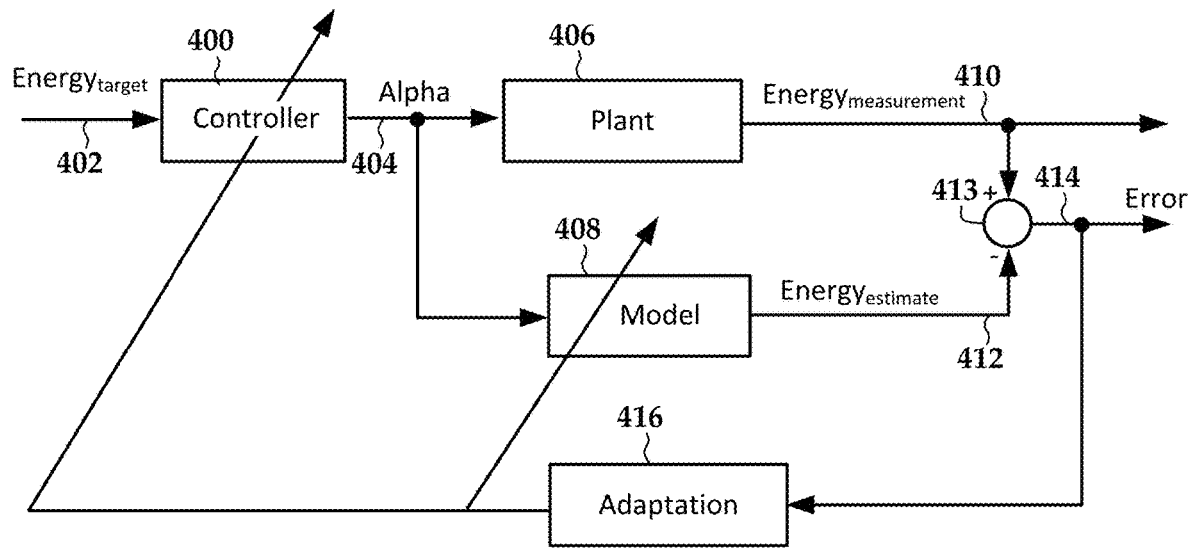
FIG. 4 is a control diagram showing adaptive energy-based command sorting according to an example embodiment.

In FIG. 4, a control diagram shows a model for dynamically adjusting the scaling factor Alpha according to an example embodiment. A controller 400 takes a target energy consumption value 402 as input, e.g., a factory set or customer-defined value. The controller outputs the scaling factor Alpha 404 which is used in the plant 406, which includes physical devices that are affected by changing Alpha 404, such as the VCM, microactuators, etc. The actual energy consumed by the plant 406 is measured, e.g., via in-drive power monitoring circuits, producing measurement 410. The energy measurement 410 may be obtained from a lookup table that is created by measuring the energy content for each seek distance for various rotational latencies (0 to 2 revolutions). In other embodiment, real time energy measurements may be used.

For the same time period that the energy measurement 410 is taken, a model 408 predictively estimates the energy, which is shown as energy estimate 412. The difference between the energy estimate 412 and the energy measurement 410 is combined at block 413 to produce an error signal 414. The error signal 414 is used by an adaptation block 416 that adaptively adjusts the controller 400 and the model 408 (as indicated by diagonal lines) such that the application of the scaling factor Alpha 404 to seek command sorting satisfies the energy target 402. Note that the energy measurements and estimates 410, 412 are defined over a unit of time, and the time rate of energy consumption is power. The system may measure power consumption at a particular sampling interval, in which the energy measurements can be made by summing/integrating the power samples over a period of time during which the samples were taken.

The model 408 for the energy estimate 412 may be defined in one embodiment as: $F(Alpha)=E_0/(1+G*Alpha)$ where F is the model and $E_0$ is average energy per unit time (power) for a given workload. The value of $E_0$ can range quite a bit depending on queue depth, transfer size, partition size, etc. The G can be thought as the gain of Alpha, such that the larger the value of G, the greater effect Alpha has on the energy level the system produces. The value of G may be large for high queue depths and small for lower queue depths. Typical values range from 1 to 2.5.

The two parameters $E_0$ and G in this model are adapted to accommodate their ranges. Different adaptation laws can be used, some linear, some not. For example, a linear control may use the Expressions (1) and (2) shown below to adapt the parameters for each step k. A non-linear control is shown in Expressions (3) and (4). These two control laws are integrators of the model error Linear Control Law $$E0[k+1]=E0[k]+L1*\text{Error} \qquad (1)$$

$$G[k+1]=G[k]+L2*\text{Error} \qquad (2)$$

Non-Linear Control Law:

$$E_0[k+1]=E_0[k]+L1*\text{Error}*E_0[k] \qquad (3)$$

$$G[k+1]=G[k]+L2*\text{Error}*Alpha[k] \qquad (4)$$

In one embodiment, the control law can cancel the plant by multiplying it by its inverse. A model based adaptive scheme can be used to estimate the relationship between energy and Alpha and then feedforward the inverse of this model to cancel the non-linear plant, thus creating a linear system with unity gain. At this point, the plant can be replaced with dynamics of choice, using feedback control. This is shown in Expression (5) below, where the plant is canceled leaving a unity transfer function, where output equals input.

Control Law:

$$\text{Alpha}[k+1]=F^{-1}[k]=(E_0[k]-E_{target}[k])/(E_{target}[k]*G[k]) \quad (5)$$

Another aspect of the algorithm involves using an accumulating down-sampling filter (ADSF) which updates the algorithm at a fixed (tunable) sampling period. Without this filter, the code would update after each TO, which result in a variable sample rate. The ADSF accumulates the energy measurements and updates at a given sample rate. The ADSF is prorates the summation to only use the portion of the sum that belongs to a particular sampling interval, carrying forward the remainder.

Figure 5:
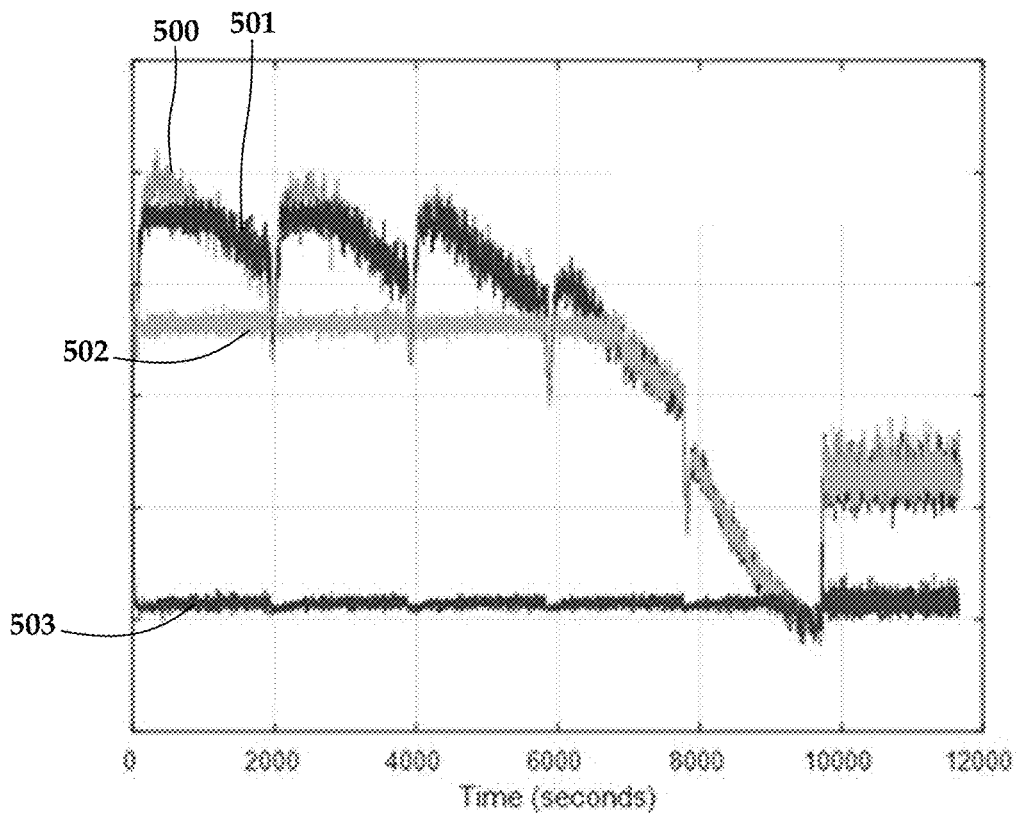
FIG. 5 is a graph showing energy used for a drive implementing different levels of energy-based sorting according to various embodiments.

In FIG. 5, a graph shows power measurements of a drive using energy-based sorting according to an example embodiment. The curves show power measured during a series of one-minute workloads: random reads, Q1 to Q32, for transfer sizes 4K, 16K, 64K, 256K, 1 MB, and a final workload of 4K random writes, Q1 to Q32 at the end. The curves 500-503 represent the sorting algorithm described above with the power regulated to four different levels: full power (curve 500), ~5% reduction in power (curve 501), ~20% reduction in power (curve 502), and ~50% reduction (curve 503).

As noted above, e.g., in the description of FIG. 2, a disk access command may have an associated priority which can be used to sort data in the queue together with the access time. Generally, these priorities can be set by the host (e.g., via filesystem drivers, operating system, etc.) in order to differentiate between data storage commands such that certain performance targets can be met. As indicated by the simplified diagram of queues 600, 602 in FIG. 6, the system can be arranged such that the higher-priority commands (those with a priority above or equal to a priority threshold $P_t$) are not subject to energy-based sorting (e.g., sorted using original, unaltered access time). In this case, the lower priority commands with priority less than the threshold are otherwise subject to energy-based sorting, e.g., using adjusted access times according to any of the embodiments described above.

Note that the combination of priority-based and energy-based sorting may be implemented in other ways than illustrated. For example, a single command queue could be used that uses both priority indicators and access time for sorting of commands. In another example, all commands could use energy-based sorting, but the target energy (e.g., input 402 in FIG. 4) or other variables (e.g., Alpha) could be different for different priority commands.

While the applications above describe a control system that allows managing drive energy usage, this control system can also be used to control other aspects of drive operation that are not typically associated with energy usage. For example, it is known that when a plurality of drives are mounted in a common enclosure, the mechanical forces (e.g., due to seeks and disk rotation) imparted by the drives to the enclosure can have a cumulative effect that degrades drive performance, e.g., increased mistracking, increased settling time for tracking, etc. While modern enclosures may include mechanical isolators to reduce the impact of the drives upon one another, there are some conditions that can still lead to mechanical drive disturbance due to drive operations such as high-energy seeks. Therefore, an energy aware sorting feature as described herein can also be used to reduce this type of drive array induced disturbance, as well as the effects of such disturbance.

Figure 7:
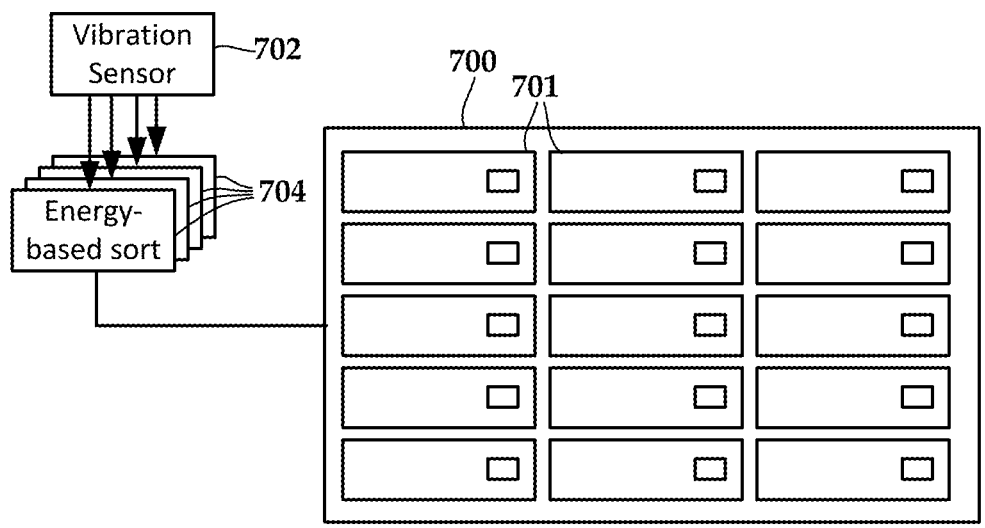
FIG. 7 is a diagram of showing the use of energy-based sorting in vibration reduction in a drive array according to an example embodiment.

In FIG. 7, a block diagram shows a drive array according to an example embodiment. An enclosure 700 includes a plurality of disk drives 701 mechanically and electrically coupled together. At least one vibration sensor 702 is located in the enclosure 700. The vibration sensor 702 may be in the enclosure outside of the drives 701 or located within one or more of the drives 701, e.g., each drive may have its own sensor. The vibration sensor 702 may include a dedicated device such as an accelerometer, and/or may indirectly estimate vibration due to secondary effects detected by the drives 701, such as the servo controllers detecting reduce performance in seeking and tracking.

An output of the vibration sensor 702 is input to an energy-based sorting algorithm 704, which may include a control loop such as shown in FIG. 4. This may be implemented in some or all drives 701 in the enclosure 700. For example, based on an indication from the vibration sensor that vibration is exceeding a threshold, the target energy could be reduced for all drives equipped with energy-based sorting 704 such that the incidence of high-energy, high-force seeks will decrease. The drives 701 could independently make this determination, or a central controller (e.g., storage controller in the enclosure 700) could make the determination and communicate the target power to the drives. The time scale of the changes induced by the vibration sensor 702 may be much larger than that of a control loop as shown in FIG. 4. This could allow the system to react fast enough to respond to transient events (e.g., surges in storage device usage, shock/vibration induced from external forces such as cooling system, maintenance, etc.) without excessively perturbing the operation of the sorting algorithms.

Figure 6:
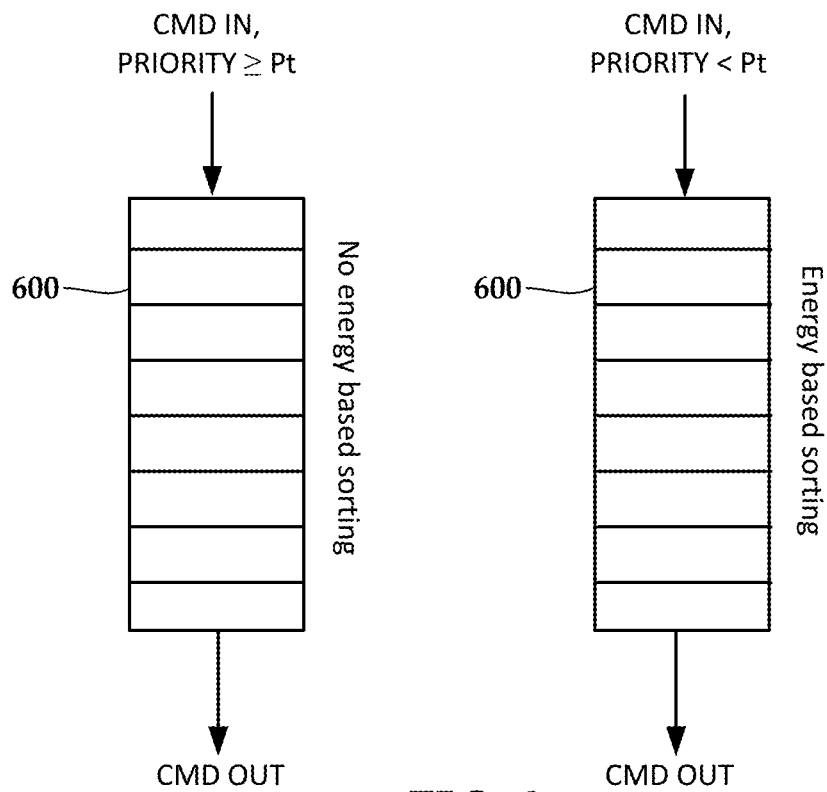
FIG. 6 is a diagram showing an energy-based and priority-based sorting schemed according to an example embodiment.

Note that a system using the arrangement shown in FIG. 7 could both reduce the drive-induced vibration within the enclosure 700, and also make seeks less likely to fail since they will have more pre-IO latency to get on track. The energy-based sorting algorithm 704 has also been found to improve the performance of other algorithms that attempt to insert 'free' write seeks before necessary 'read' seeks by increasing the pre-IO latency along with the power reduction. Also note that the arrangement shown in FIG. 7 may be combined with the priority indicator as shown in FIG. 6. In some cases, just the lower priority commands could have energy adjusted in response to detected vibration levels. In another arrangement, the high-priority seeks, if not using energy-based sorting, may use energy-based sorting (at least temporarily) in order to deal with unusually high levels of disturbance. In yet another arrangement, if the higher and lower priority seeks are using different levels of energy-based sorting (e.g., different power targets, different Alphas), then both may be change by the same amounts (e.g., proportionally) or different amounts.

Figure 8:
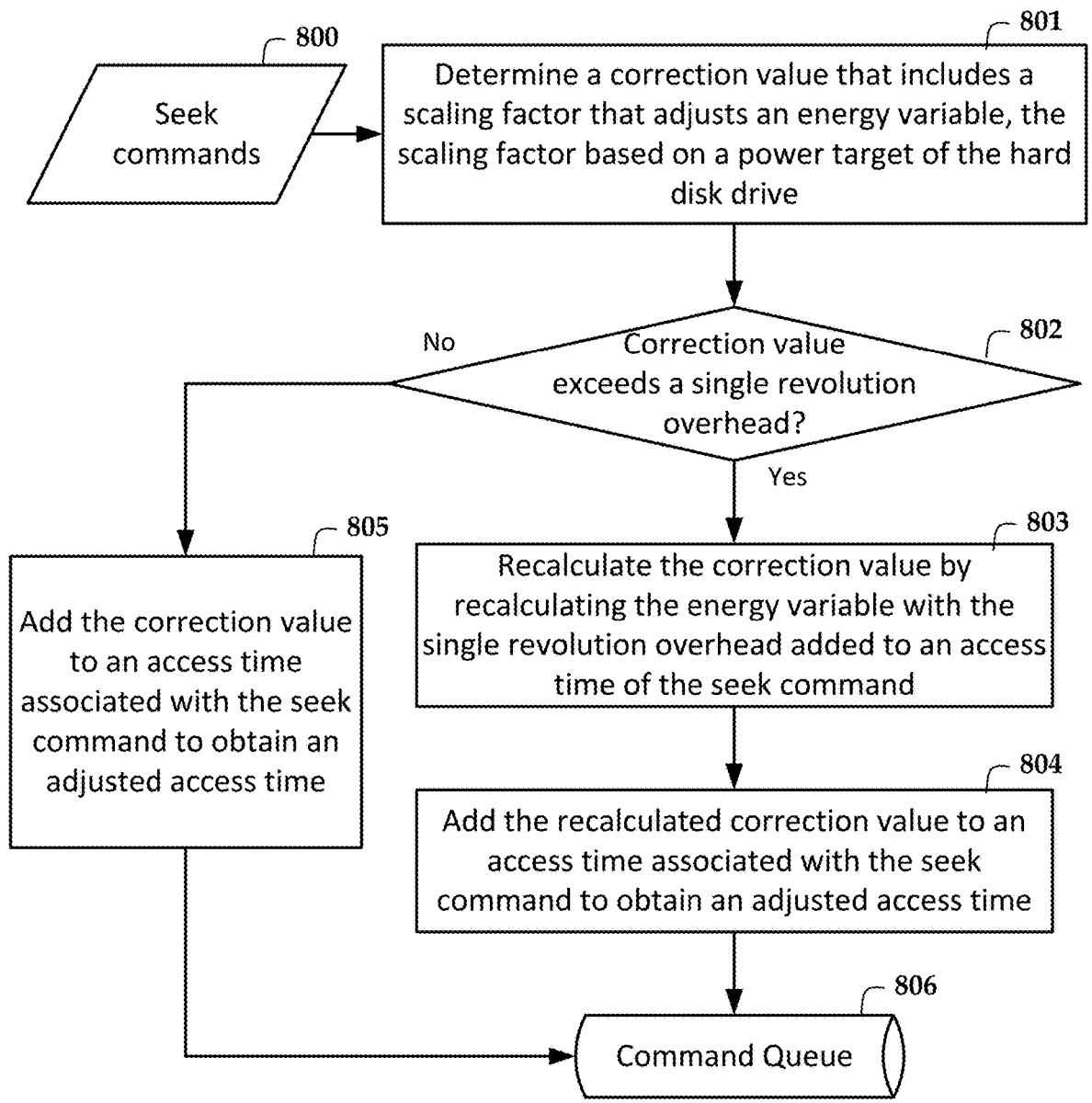
FIGS. 8, 9, 10, and 11 are flowcharts of methods according to example embodiments.

In FIG. 8, a flowchart shows a method according to an example embodiment. The method involves, for each seek command 800 of a plurality of seek commands of a hard disk drive, determining 801 a correction value that comprises a scaling factor that adjusts an energy variable. The scaling factor is based on a power target of the hard disk drive. The energy variable represents an energy used in the seek command as a time value. If it is determined 802 the correction value exceeds a single revolution overhead, the correction value is recalculated 803 by recalculating the energy variable with the single revolution overhead added to an access time of the seek command. The recalculated correction value is added 804 to an access time associated with the seek command to obtain an adjusted access time. If the correction value does not exceed a single revolution overhead (block 802 returns 'no'), then the original correction value is added 804 to the access time associated with the seek command to obtain the adjusted access time. The seek commands are set to a command queue 806 that sorts the commands by the adjusted access times. The seek commands are executed by a controller of the hard disk drive based on the sorting within the command queue.

Figure 9:
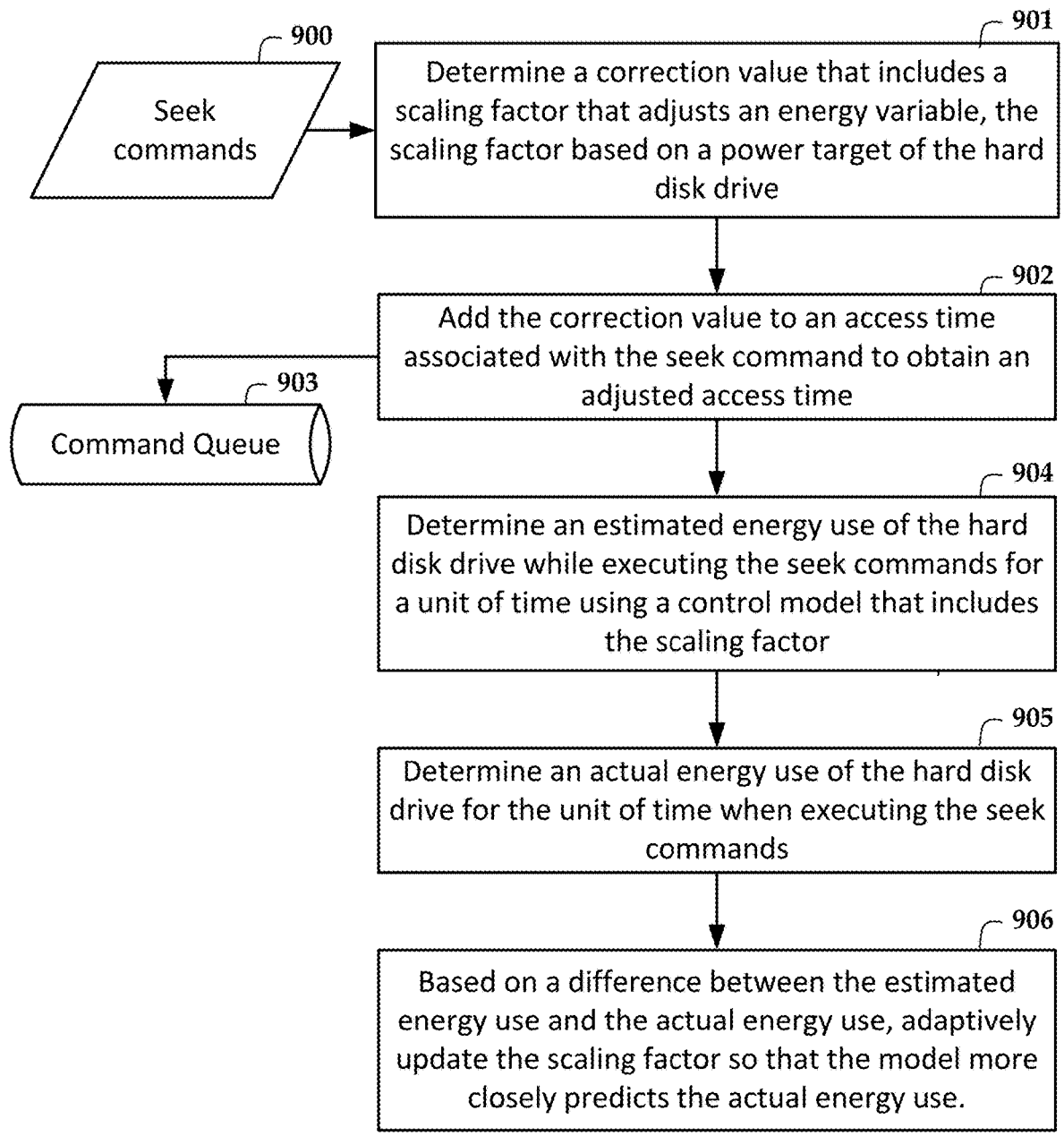

In FIG. 9, a flowchart shows a method according to another example embodiment. The method involves for each seek command 900 of a plurality of seek commands of a hard disk drive, a correction value is determined 901 that comprises a scaling factor that adjusts an energy variable. The scaling factor is based on a power target of the hard disk drive. The energy variable representing an energy used in the seek command as a time value. The correction value is added 902 to an access time associated with the seek command to obtain an adjusted access time. The seek commands are sorted in a command queue 903 by the adjusted access times. The seek commands are executed by a controller of the hard disk drive based on the sorting within the command queue.

The method further involves determining 904 an estimated energy use of the hard disk drive while executing the seek commands for a unit of time using a control model that includes the scaling factor. An actual energy use of the hard disk drive is determined 905 for the unit of time when executing the seek commands. Based on a difference between the estimated energy use and the actual energy use, the scaling factor is adaptively updated 906 so that the model more closely predicts the actual energy use.

Figure 10:
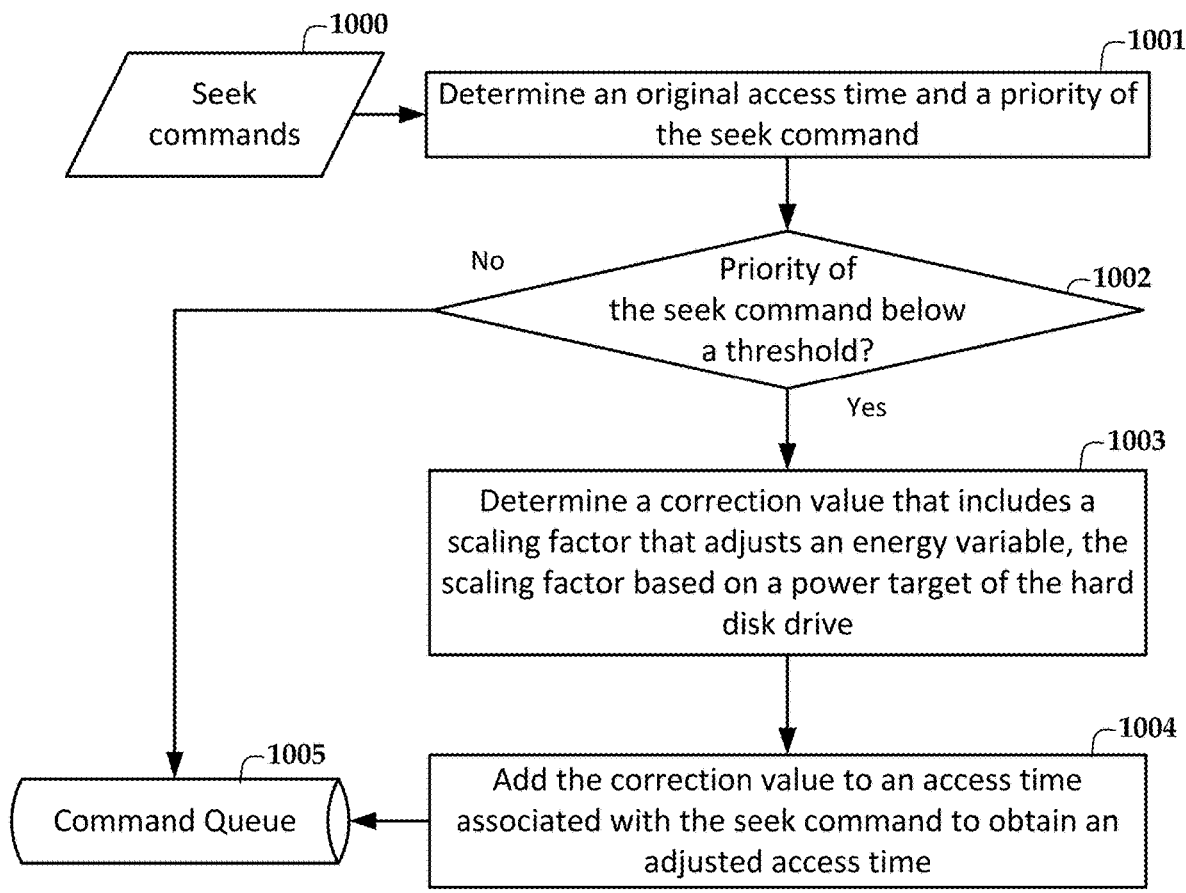

In FIG. 10, a flowchart shows a method according to another example embodiment. The method involves, for each seek command 1000 of a plurality of seek commands of a hard disk drive, determining 1001 an original access time and a priority of the seek command. Based on the priority of the seek command being below a threshold as determined at block 1002, a correction value is determined 1003 that comprises a scaling factor that adjusts an energy variable. The scaling factor is based on a power target of the hard disk drive. The energy variable represents an energy used in the seek command as a time value. The correction value is added 1004 to the original access time to obtain an adjusted access time.

The seek commands are sorted in one or more command queues 1005 by the adjusted access times for those seek commands with the priority below the threshold. Otherwise, (in the case where block 1002 exits 'no') the seek command are sorted in the command queues 1005 by the original access time for those seek commands with the priority above or equal to the threshold. The seek commands are executed by a controller of the hard disk drive based on the sorting within one or more command queues.

Figure 11:
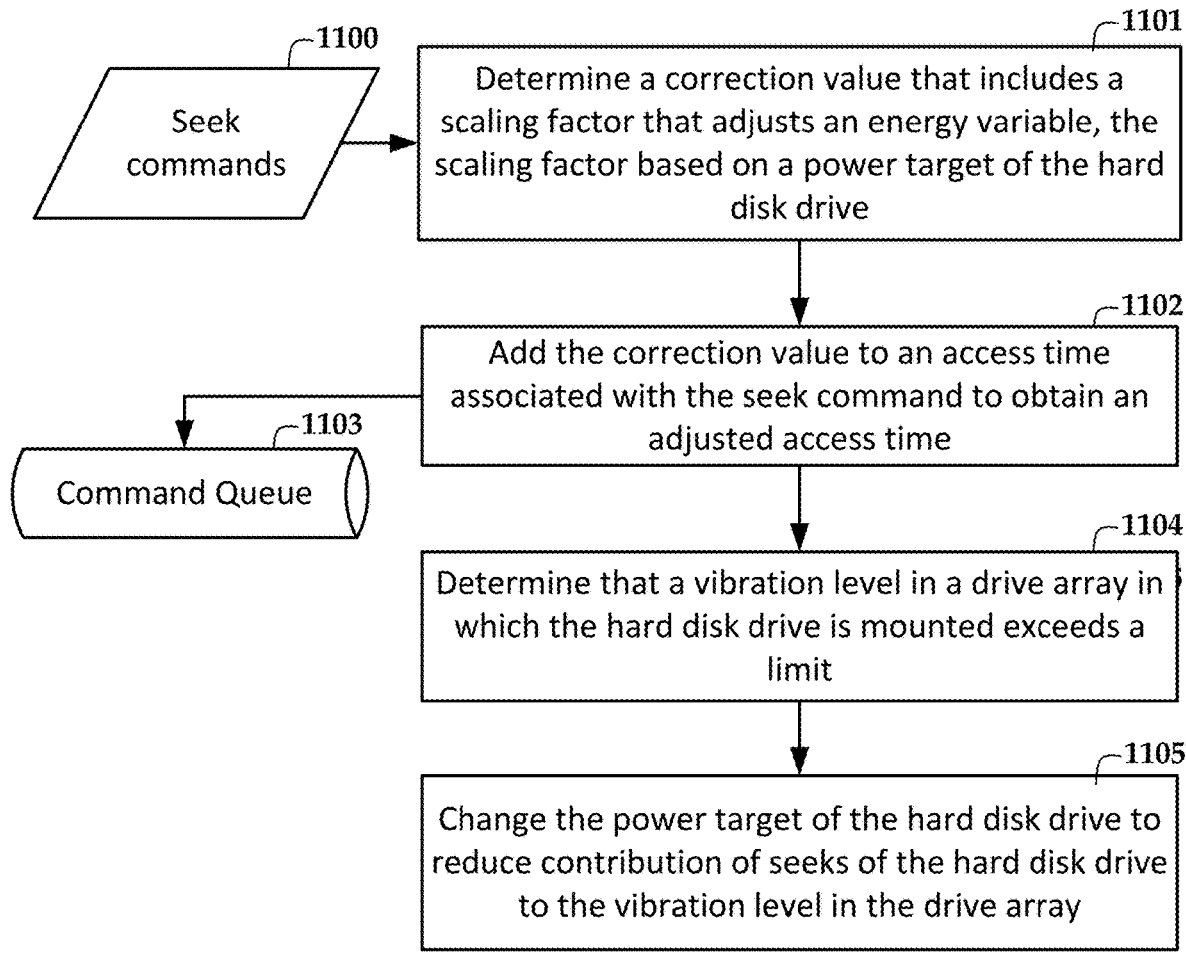

In FIG. 11, a flowchart shows a method according to another example embodiment. The method involves, for each seek command 1100 of a plurality of seek commands of a hard disk drive, determining 1101 a correction value that includes a scaling factor that adjusts an energy variable. The scaling factor is based on a power target of the hard disk drive, and the energy variable represents an energy used in the seek command as a time value. The correction value is added 1102 to an access time associated with the seek command to obtain an adjusted access time. The seek commands in a command queue 1103 by the adjusted access times. The seek commands are executed by a controller of the hard disk drive based on the sorting within the command queue. If it is determined 1104 that a vibration level in a drive array in which the hard disk drive is mounted exceeds a limit, the power target of the hard disk drive is changed to reduce contribution of seeks of the hard disk drive to the vibration level in the drive array. While not shown, the method may further involve determining that the vibration level goes below a second limit, in which case the power target of the hard disk drive is changed to increase to allow more energy-intensive seeks of the hard disk.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   for each seek command of a plurality of seek commands of a hard disk drive, determining a correction value that comprises a scaling factor that adjusts an energy variable, the scaling factor being based on a power target of the hard disk drive, the energy variable representing an energy used in the seek command as a time value;
   determining that the correction value exceeds a single revolution overhead, and in response, recalculating the correction value by recalculating the energy variable with the single revolution overhead added to an access time of the seek command;
   adding the recalculated correction value to an access time associated with the seek command to obtain an adjusted access time; and
   sorting the seek commands in a command queue by the adjusted access times, the seek commands being executed by a controller of the hard disk drive based on the sorting within the command queue.

2. The method of claim 1, further comprising:
   determining that the recalculated correction value exceeds a two revolution overhead; and
   capping the adjusted access time to the two revolution overhead.

3. The method of claim 1, wherein the energy variable represents an energy used in the seek command as a time value in wedges.

4. The method of claim 1, further comprising:
  determining an estimated energy use of the hard disk drive for a unit of time using a control model that includes the scaling factor;
  determining an actual energy use of the hard disk drive for the unit of time; and
  based on a difference between the estimated energy use and the actual energy use, adaptively update the scaling factor so that the model more closely predicts the actual energy use.

5. The method of claim 1, wherein the seek commands further comprise a priority value, and wherein for the seek commands with a priority value above a threshold, the access time is not adjusted.

6. The method of claim 1, further comprising:
  determining that a vibration level in a drive array in which the hard disk drive is mounted exceeds a limit; and
  changing the power target of the hard disk drive to reduce contribution of seeks of the hard disk drive to the vibration level in the drive array.

7. An apparatus comprising the hard disk drive, the apparatus comprising a processor operable to perform the method of claim 1.

8. A method, comprising:
  for each seek command of a plurality of seek commands of a hard disk drive, determining a correction value that comprises a scaling factor that adjusts an energy variable, the scaling factor being based on a power target of the hard disk drive, the energy variable representing an energy used in the seek command as a time value;
  adding the correction value to an access time associated with the seek command to obtain an adjusted access time;
  sorting the seek commands in a command queue by the adjusted access times, the seek commands being executed by a controller of the hard disk drive based on the sorting within the command queue;
  determining an estimated energy use of the hard disk drive while executing the seek commands for a unit of time using a control model that includes the scaling factor;
  determining an actual energy use of the hard disk drive for the unit of time when executing the seek commands; and
  based on a difference between the estimated energy use and the actual energy use, adaptively updating the scaling factor so that the model more closely predicts the actual energy use.

9. The method of claim 8, further comprising determining that the correction value exceeds a single revolution overhead, and in response, recalculating the correction value by recalculating the energy variable with the single revolution overhead added to an access time of the seek command, the recalculated correction value being used to obtain the adjusted access time.

10. The method of claim 9, further comprising:
  determining that the recalculated correction value exceeds a two revolution overhead; and
  capping the adjusted access time to the two revolution overhead.

11. The method of claim 8, wherein the energy variable represents an energy used in the seek command as a time value in wedges.

12. The method of claim 8, wherein the seek commands further comprise a priority value, and wherein for the seek commands with a priority value above a threshold, the access time is not adjusted.

13. The method of claim 8, further comprising:
  determining that a vibration level in a drive array in which the hard disk drive is mounted exceeds a limit; and
  changing the power target of the hard disk drive to reduce contribution of seeks of the hard disk drive to the vibration level in the drive array.

14. An apparatus comprising the hard disk drive, the apparatus comprising a processor operable to perform the method of claim 8.

15. A method, comprising:
  for each seek command of a plurality of seek commands of a hard disk drive:
    determining an original access time and a priority of the seek command;
    based on the priority of the seek command being below a threshold:
      determining a correction value that comprises a scaling factor that adjusts an energy variable, the scaling factor being based on a power target of the hard disk drive, the energy variable representing an energy used in the seek command as a time value; and
      adding the correction value to the original access time to obtain an adjusted access time; and
  sorting the seek commands in one or more command queues by the adjusted access times for those seek commands with the priority below the threshold, otherwise sorting the seek command in the one or more command queues by the original access time for those seek commands with the priority above or equal to the threshold, the seek commands being executed by a controller of the hard disk drive based on the sorting within one or more command queues.

16. The method of claim 15, further comprising:
  determining an estimated energy use of the hard disk drive while executing the seek commands for a unit of time using a control model that includes the scaling factor;
  determining an actual energy use of the hard disk drive for the unit of time when executing the seek commands; and
  based on a difference between the estimated energy use and the actual energy use, adaptively updating the scaling factor so that the model more closely predicts the actual energy use.

17. The method of claim 15, further comprising:
  determining that a vibration level in a drive array in which the hard disk drive is mounted exceeds a limit; and
  changing the power target of the hard disk drive to reduce contribution of seeks of the hard disk drive to the vibration level in the drive array.

18. The method of claim 15, wherein the energy variable represents an energy used in the seek command as a time value in wedges.

19. The method of claim 15, further comprising determining that the correction value exceeds a single revolution overhead, and in response, recalculating the correction value by recalculating the energy variable with the single revolution overhead added to an access time of the seek command, the recalculated correction value being used to obtain the adjusted access time.

20. An apparatus comprising the hard disk drive, the apparatus comprising a processor operable to perform the method of claim 15.

\* \* \* \* \*